United States Patent
Schnaibel et al.

(10) Patent No.: US 6,550,236 B1
(45) Date of Patent: Apr. 22, 2003

(54) METHOD FOR OPERATING A THREE-WAY CATALYST OF AN INTERNAL COMBUSTION ENGINE

(75) Inventors: Eberhard Schnaibel, Hemmingen (DE); Andreas Koring, Ludwigsburg (DE); Holger Bellmann, Ludwigsburg (DE); Thomas Wahl, Pforzheim (DE); Andreas Blumenstock, Ludwigsburg (DE); Klaus Winkler, Rutesheim (DE); Frank Stanglmeier, Möglingen (DE); Bernd Schumann, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,677

(22) PCT Filed: Nov. 21, 2000

(86) PCT No.: PCT/DE00/04102

§ 371 (c)(1),
(2), (4) Date: Nov. 30, 2001

(87) PCT Pub. No.: WO01/49990

PCT Pub. Date: Jul. 12, 2001

(30) Foreign Application Priority Data

Dec. 31, 1999 (DE) .................. 199 63 924

(51) Int. Cl.[7] ............................... F01N 3/00
(52) U.S. Cl. .................. 60/277; 60/274; 60/284
(58) Field of Search .................. 60/274, 276, 277; 285/284, 301; 73/118.1

(56) References Cited

U.S. PATENT DOCUMENTS

| | | | | |
|---|---|---|---|---|
| 5,419,122 A | * | 5/1995 | Tabe et al. | 60/277 |
| 5,675,967 A | * | 10/1997 | Ries-Mueller | 60/277 |
| 5,713,198 A | | 2/1998 | Takashi et al. | |
| 5,715,676 A | * | 2/1998 | Schnaibel et al. | 60/277 |
| 6,073,440 A | * | 6/2000 | Douta et al. | 60/277 |
| 6,082,101 A | * | 7/2000 | Manaka et al. | 60/277 |
| 6,138,453 A | * | 10/2000 | Sawada et al. | 60/277 |
| 6,145,302 A | * | 11/2000 | Zhang et al. | 60/274 |
| 6,401,453 B1 | * | 6/2002 | Lemire | 60/274 |

FOREIGN PATENT DOCUMENTS

| | | |
|---|---|---|
| EP | 0943792 | 9/1999 |
| JP | 11 229859 | 11/1999 |
| JP | 11 229864 | 11/1999 |

* cited by examiner

*Primary Examiner*—Thomas Denion
*Assistant Examiner*—Tu M. Nguyen
(74) *Attorney, Agent, or Firm*—Walter Ottesen

(57) ABSTRACT

An internal combustion engine (1), especially for a motor vehicle, is described, which has a three-way catalytic converter (12") and a storage catalytic converter (12') which can be loaded with and unloaded of nitrogen oxides. A diagnosis of the storage catalytic converter (12') is carried out by a control apparatus (18) below a temperature at which the three-way catalytic converter (12") does not yet operate.

6 Claims, 1 Drawing Sheet

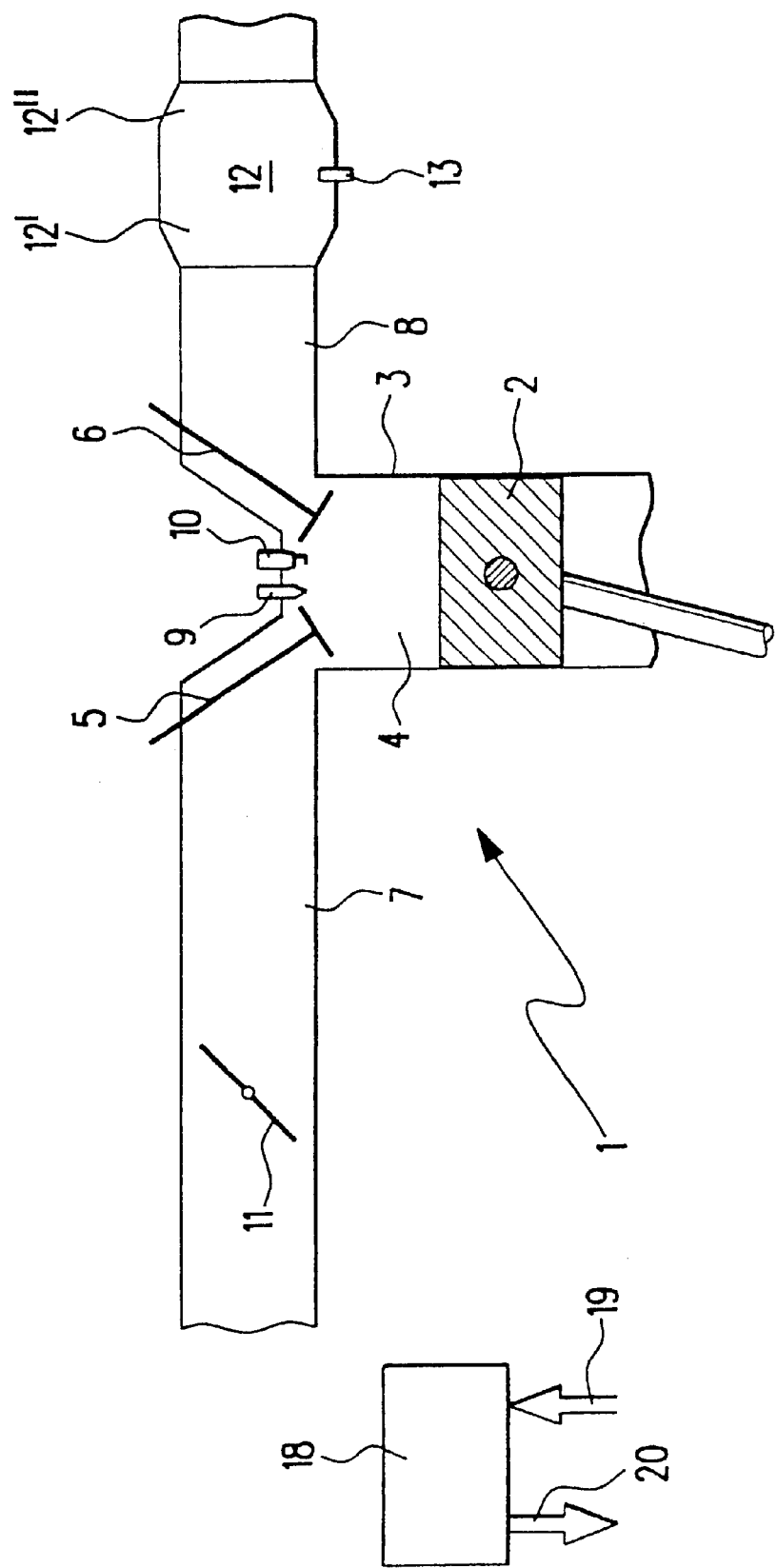

METHOD FOR OPERATING A THREE-WAY CATALYST OF AN INTERNAL COMBUSTION ENGINE

FIELD OF THE INVENTION

The invention relates to a method for operating a storage catalytic converter of an internal combustion engine, especially of a motor vehicle, wherein the storage catalytic converter is coupled to a three-way catalytic converter and wherein the storage catalytic converter is loaded with and unloaded of nitrogen oxides. Likewise, the invention relates to a control apparatus for an internal combustion engine, especially of a motor vehicle, as well as an internal combustion engine especially for a motor vehicle.

BACKGROUND OF THE INVENTION

A method of this kind, a control apparatus of this kind and an internal combustion engine of this kind are, for example, known for a so-called gasoline direct injection. There, the fuel is injected into the combustion chamber of the engine in a homogeneous operation during the induction phase or in a stratified operation during the compression phase. The homogeneous operation is preferably provided for the full-load operation of the engine while the stratified operation is suitable for the idle and part-load operation. In such a direct injecting internal combustion engine, a switchover is made between the mentioned operating modes, for example, in dependence upon the requested torque.

It is especially important to have a storage catalytic converter especially for carrying out the stratified operation. With the storage catalytic converter, developing nitrogen oxides can be intermediately stored in order to reduce the same during a subsequent homogeneous operation. This storage catalytic converter is loaded with the nitrogen oxides during stratified operation and is again unloaded during homogeneous operation. This loading and unloading as well as thermal loads and contaminations lead to a deterioration of the storage catalytic converter. Diagnostic methods for the storage catalytic converter are carried out to monitor this deterioration.

SUMMARY OF THE INVENTION

It is an object of the invention to provide a method for operating a storage catalytic converter of an internal combustion engine with which the deterioration of the storage catalytic converter can be accurately monitored.

This object is achieved with a method of the above-mentioned type in accordance with the invention in that a diagnosis of the storage catalytic converter is carried out below a temperature at which the three-way catalytic converter does not yet operate. The object is solved correspondingly with a control apparatus and an internal combustion engine of the type mentioned initially herein.

If the diagnosis is carried out at a temperature, for example, below approximately 250 degrees, then this affords the advantage that the three-way catalytic converter has no influence yet on the diagnosis of the storage catalytic converter because the operating region of the three-way catalytic converter has not yet been reached. The diagnostic result for the storage catalytic converter is therefore not made incorrect but is, with high accuracy, referred exclusively to the storage catalytic converter.

In an advantageous embodiment of the invention, the diagnosis is carried out above a temperature at which the storage catalytic converter operates. In this way, it is ensured that the storage catalytic converter is in its own operating region and the diagnosis of the storage catalytic converter can be carried out reliably and accurately.

It is especially advantageous when the temperature of the storage catalytic converter is measured by a temperature sensor. In this way, the above-mentioned temperature region is especially easily determined and monitored.

Of special significance is the realization of the method of the invention in the form of a control element which is provided for a control apparatus of an internal combustion engine, especially of a motor vehicle. A program is stored on the control element which can be run on a computing apparatus, especially on a microprocessor, and is suitable for executing the method in accordance with the invention. In this case, the invention is therefore realized by a program stored on the control element so that this control element, which is provided with the program, defines the invention in the same way as the method for whose execution the program is suitable. As a control element, an electric storage medium is especially applicable, for example, a read-only-memory or a flash memory.

Further features, possibilities of application and advantages of the invention will become apparent from the description of the embodiments of the invention which follow and which are shown in the figures of the drawing. All described or illustrated features form the subject matter of the invention individually or in any combination independently of the composition thereof in the patent claims or their dependency as well as independently of their formulation in the description or their illustration in the drawing.

BRIEF DESCRIPTION OF THE DRAWINGS

The single FIGURE of the drawing shows a schematic representation of an embodiment of an internal combustion engine according to the invention.

DESCRIPTION OF THE PREFERRED EMBODIMENTS OF THE INVENTION

In FIG. 1, an internal combustion engine 1 of a motor vehicle is illustrated wherein a piston 2 is movable back and forth in a cylinder 3. The cylinder 3 is provided with a combustion chamber 4 which is delimited, inter alia, by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and outlet valve 6. Fuel can be injected into the combustion chamber 4 via the injection valve 9. The fuel can be ignited in the combustion chamber 4 with the spark plug 10.

A rotatable throttle flap 11 is accommodated in the intake manifold 7 via which air can be supplied to the intake manifold 7. The quantity of the supplied air is dependent upon the angular position of the throttle flap 11. A catalytic converter 12 is accommodated in the exhaust-gas pipe 8 and functions to purify the exhaust gases arising from the combustion of the fuel.

The catalytic converter 12 is a storage catalytic converter 12' which is coupled to a three-way catalytic converter 12". The catalytic converter 12 is therefore, inter alia, provided for intermediately storing nitrogen oxides (NOx). A temperature sensor 13 is provided in the catalytic converter 12 with which the temperature of the exhaust gas, which flows through the storage catalytic converter 12', and/or the temperature of the storage catalytic converter 12' itself is measured.

Input signals 19 are applied to control apparatus 18 and define operating variables of the engine 1 measured by means of sensors. The control apparatus 18 generates output signals 20 with which the performance of the engine 1 can be influenced via actuators and/or positioning devices. The control apparatus is, inter alia, provided for controlling (open loop and/or closed loop) the operating variables of the engine 1. For this purpose, the control apparatus 18 is provided with a microprocessor which has a program stored in a storage medium, especially in a flash memory, and the program is suited to carry out of the above-mentioned control (open loop and/or closed loop).

In a first operating mode, a so-called homogeneous operation of the internal combustion engine 1, the throttle flap 11 is partially opened and closed in dependence upon the desired torque. The fuel is injected into the combustion chamber 4 by the injection valve 9 during an induction phase caused by the piston 2. The injected fuel is swirled by the air which is inducted simultaneously via the throttle flap 11 and the fuel is thereby distributed essentially uniformly in the combustion chamber. Thereafter, the air/fuel mixture is compressed during the compression phase in order to then be ignited by the spark plug 10. The piston 2 is driven by the expansion of the ignited fuel. In homogeneous operation, the developed torque is dependent, inter alia, from the position of the throttle flap 11. The air/fuel mixture is adjusted as closely as possible to lambda equal one with a view toward a reduced development of toxic substances.

In a second mode of operation, a so-called stratified operation of the engine 1, the throttle flap 11 is opened wide. The fuel is injected into the combustion chamber 4 by the injection valve 9 during a compression phase caused by the piston 2 and this injection is local in the immediate vicinity of the spark plug 10 as well as timely at a suitable interval ahead of the ignition time point. Then, with the aid of the spark plug 10, the fuel is ignited so that the piston 2 is driven in the following work phase by the expansion of the ignited fuel. The developing torque is, in stratified operation, dependent substantially on the injected fuel mass. The stratified operation is essentially provided for the idle operation and the part-load operation of the engine 1.

The storage catalytic converter 12' of the catalytic converter 12 is loaded with nitrogen oxides during the stratified operation. In a subsequent homogeneous operation, the storage catalytic converter 12' is again unloaded and the nitrogen oxides are reduced by the three-way catalytic converter 12".

Over time, the storage catalytic converter 12' takes on sulphur during its continuous loading and unloading with nitrogen oxides. This leads to a limiting of the storage capability of the storage catalytic converter 12' which is characterized in the following as deterioration. Diagnostic methods are carried out to recognize the deterioration of the storage catalytic converter 12'.

The storage catalytic converter 12' operates at temperatures above approximately 200 degrees C. The three-way catalytic converter 12" operates at temperatures above approximately 250 degrees C.

If one were to check the storage catalytic converter 12' with any diagnostic methods above 250 degrees, then this would have the consequence that always influences of the three-way catalytic converter 12" would be present. Especially in this case, the capability of the three-way catalytic converter 12" to store oxygen would play a role. This would make the diagnosis of the storage catalytic converter 12' incorrect.

According to the invention, the diagnostic methods are applied at a temperature which is above 200 degrees C. but below 250 degrees C. This diagnostic method is therefore carried out at a temperature which lies below a temperature at which the three-way catalytic converter 12" does not yet operate. Further, the diagnostic method is carried out at a temperature which lies above a temperature at which the storage catalytic converter 12' operates. For this reason, the storage catalytic converter 12' is in its operating region, but the three-way catalytic converter 12" is not yet. In this way, the three-way catalytic converter 12" has no influence on the diagnosis of the storage catalytic converter 12'.

The above-mentioned temperature region can be determined with the aid of the temperature sensor 13 and can be monitored as may be required. The above-described method as well as the above-mentioned diagnostic method can be carried out by the control apparatus 18.

It is understood that the above-given temperatures are dependent upon the catalytic converter 12 which is used in the particular instance. Thus, it can be necessary to correspondingly change the above-mentioned temperatures.

What is claimed is:

1. A control apparatus for an internal combustion engine including an internal combustion engine of a motor vehicle, the engine having a three-way catalytic converter and a storage catalytic converter which can be loaded with and unloaded of nitrogen oxides, the control apparatus comprising means for carrying out a diagnosis of the storage catalytic converter below a temperature at which the three-way catalytic converter does not yet operate.

2. An internal combustion engine including an internal combustion engine for a motor vehicle, the internal combustion engine comprising:
   a three-way catalytic converter and a storage catalytic converter, which can be loaded with and unloaded of nitrogen oxides; and,
   a control apparatus including means for carrying out a diagnosis of the storage catalytic converter below a temperature at which the three-way catalytic converter does not yet operate.

3. A method for operating a storage catalytic converter of an internal combustion engine including an internal combustion engine of a motor vehicle, the method comprising the steps of:
   coupling the storage catalytic converter to a three-way catalytic converter;
   loading the storage catalytic converter with nitrogen oxides and unloading the storage catalytic converter of nitrogen oxides; and,
   carrying out a diagnosis of the storage catalytic converter below a temperature at which the three-way catalytic converter does not yet operate.

4. The method of claim 3, wherein the diagnosis is carried out above a temperature at which the storage catalytic converter operates.

5. The method of claim 3, wherein the temperature of the storage catalytic converter is measured via a temperature sensor.

6. A control element including a flash memory for a control apparatus of an internal combustion engine including an internal combustion engine of a motor vehicle, the control element comprising a program stored thereon which can be run on a computer apparatus including on a microprocessor, and the program being suitable for carrying out a method for operating a storage catalytic converter of an internal combustion engine including an internal combustion engine of a motor vehicle, the method comprising the steps of:

coupling the storage catalytic converter to a three-way catalytic converter;

loading the storage catalytic converter with nitrogen oxides and unloading the storage catalytic converter of nitrogen oxides; and, carrying out a diagnosis of the storage catalytic converter below a temperature at which the three-way catalytic converter does not yet operate.

* * * * *